United States Patent
Gayoh

(10) Patent No.: US 7,007,570 B2
(45) Date of Patent: Mar. 7, 2006

(54) PEDAL CRANK MECHANISM FOR BICYCLE

(76) Inventor: Naotaka Gayoh, 2-9-15, Nishikamata, Ohta-ku, Tokyo (JP)

(*) Notice: Subject to any disclaimer, the term of this patent is extended or adjusted under 35 U.S.C. 154(b) by 304 days.

(21) Appl. No.: 10/396,354

(22) Filed: Mar. 26, 2003

(65) Prior Publication Data
US 2004/0112170 A1    Jun. 17, 2004

(30) Foreign Application Priority Data
Dec. 17, 2002 (JP) .............................. 2002-365189

(51) Int. Cl.
G05G 1/14    (2006.01)
(52) U.S. Cl. .................. 74/594.3; 74/594.1; 74/594.2; 280/236; 280/256
(58) Field of Classification Search .............. 74/594.1, 74/594.2, 594.3; 280/236, 256, 261
See application file for complete search history.

(56) References Cited

U.S. PATENT DOCUMENTS

| | | | | |
|---|---|---|---|---|
| 96,208 A | * | 10/1869 | Dayton | 280/236 |
| 1,323,004 A | * | 11/1919 | Boyd | 74/594.3 |
| 4,898,047 A | * | 2/1990 | Cropek | 74/594.2 |
| 5,142,937 A | * | 9/1992 | Takahara et al. | 74/594.3 |
| 6,152,471 A | * | 11/2000 | Kang et al. | 280/261 |
| 6,663,127 B1 | * | 12/2003 | Miller | 280/256 |

FOREIGN PATENT DOCUMENTS

| | | | | |
|---|---|---|---|---|
| EP | 0 387 382 | * | 3/1989 | 74/594.3 |
| JP | 53-66755 | | 9/1951 | |
| JP | 4-87893 | * | 3/1992 | 74/594.3 |
| JP | 11-263275 | | 9/1999 | 74/594.3 |

* cited by examiner

Primary Examiner—Vinh T. Luong
(74) Attorney, Agent, or Firm—Wenderoth, Lind & Ponack, L.L.P.

(57) ABSTRACT

A bicycle crank mechanism comprises a main crank, a follower crank, and a connecting lever disposed between free ends of the main and follower cranks. A second fixed fulcrum shaft of the follower crank is arranged obliquely upwardly and backwardly of a first fixed fulcrum shaft of the main crank, the follower crank extending downward beyond a line connecting the first and second fixed fulcrum shafts from the second fixed fulcrum shaft such that the second free fulcrum shaft is swung below the line connecting the first and second fixed fulcrum shafts. A pedal is attached to a projection end of the lever and arranged in the vicinity of the free end of the main crank, the pedal being rotated along a non-circular track passing between the first and second fixed fulcrum shafts, and the first fixed fulcrum shaft being located at an internal area of the track.

1 Claim, 4 Drawing Sheets

FIG. 7
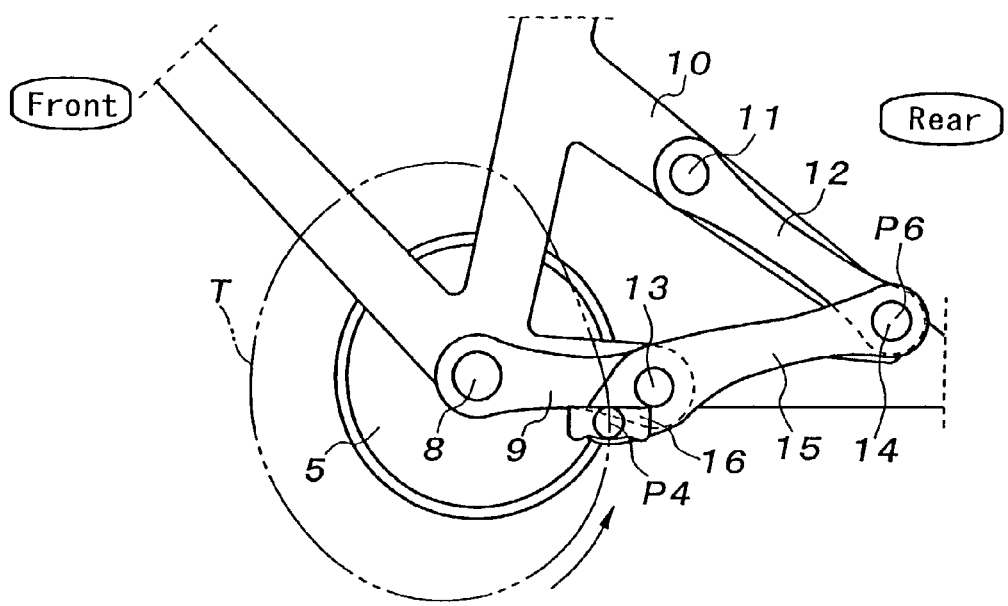
FIG. 8(A)
FIG. 8(B)
(Prior Art)
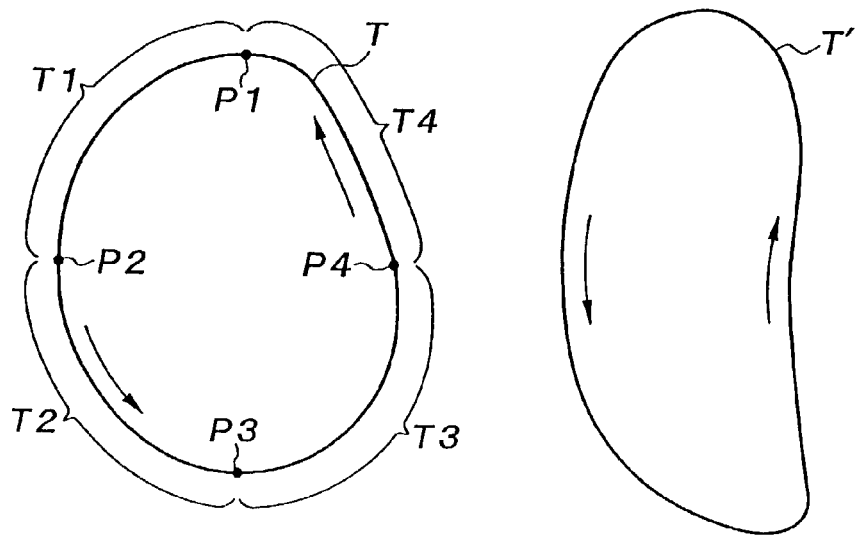

PEDAL CRANK MECHANISM FOR BICYCLE

BACKGROUND OF THE INVENTION

1. Field of the Invention

This invention relates to a pedal crank mechanism for a bicycle, and more particularly to an improvement of a bicycle equipped with a driving force input device having a swinging fulcrum which is disclosed in Japanese Patent Application Laid-Open No. H11-263275 (patent document 1).

2. Related Art

The pedal crank mechanism disclosed in the patent document 1 will be explained using the terms which are used in the description of the present invention. This mechanism comprises an active crank 24 supported through a first fixed fulcrum shaft 25 as a shaft of a driving wheel, a follower crank 21 supported on a frame in the vicinity of the driving wheel 26 through a second fixed fulcrum shaft 31, and a connecting lever 22 connected to a free end of the active crank 24 through a first free fulcrum shaft 35 and also connected to a free end of the follower crank 21 through a second free fulcrum shaft 32.

The mechanism further comprises a pedal 23 attached to an end part opposite to an end part on the second free fulcrum shaft 32 side of the connecting lever 22 and spaced apart from the first free fulcrum shaft 35.

The active crank 24 is caused to rotate about the first fixed fulcrum shaft 25 in unison with the driving wheel 26 by the stepping force exerted to the pedal 23, and the rotational motion of the active crank 24 is transmitted to the passive crank 21 through the connecting lever 22 so that the passive crank 21 is swung about the second fixed fulcrum shaft 31, thereby rotating the pedal 23 along a non-circular track (pedal track) T.

The pedal crank mechanism for a bicycle disclosed in the patent document 1 has the following constitutional features A' through D' in comparison with those of the present invention:

- A'. the second fixed fulcrum shaft 31 is arranged on a horizontal line passing through the first fixed fulcrum shaft 25, i.e., a line connecting the shaft 1a of the front wheel 1 and the shaft 2a of the rear wheel 2 with each other;
- B'. the passive crank 21 is extended upward beyond the line connecting the first and second fixed fulcrum shafts 25, 31 with each other from the second fixed fulcrum shaft 31 such that the second free fulcrum shaft 32 at its free end is swung above the line connecting the first and second fixed fulcrum shafts 25, 31 with each other;
- C'. the connecting lever 22 has a bent configuration like a dogleg, the lever 22 is connected at its intermediate bent part to the free end of the active crank 24 through the first free fulcrum shaft 35, and the pedal 23 is attached to the connecting lever 22 part extending to the opposite side to the second free fulcrum shaft 32 from the first free fulcrum shaft 35 of the connecting lever 22; and
- D'. the pedal 23 is rotated at a front part of the first fixed fulcrum shaft 25 of the active crank 24, the pedal 23 is rotated along a deformed prolate elliptical tack (pedal track) T which is long in the up and down directions at its front part but short in the left and right directions, and the first fixed fulcrum shaft 25 of the active crank 24 is located at an external area of the deformed prolate elliptical track T.

It should be noted that the patent document 1 refers to the official gazette of Japanese Patent Application Laid-Open No. H11-263275.

As apparent from the deformed prolate elliptical track (pedal track) which is, as typically shown in its FIG. 5, long in the up and down directions and short in left and right directions, the pedal crank mechanism for a bicycle shown in the patent document 1 has such advantages that the pedal stepping force is, as a whole, increased in power factor. However, it has the following disadvantages. In the rotational track at the time of stepping the pedals toward the lower rotational dead point from the upper rotational dead point performed alternately by the right leg and the left leg in the related art, a stepping force chiefly in the vertical direction is required and this turns out to be the cause of fatigue to the rider.

In consideration of, and from the view point of, balancing the muscles of the entire leg, load is imposed on the local muscles for chiefly vertically moving the pedals and as a result, fatigue is increased. Thus, the bicycle equipped with this mechanism is not suited for a long distance riding tour.

Moreover, this mechanism of the related art tends to force the leg to form an unnatural bending shape in the returning track. This makes it difficult for the rider to keep riding the bicycle and the rider experiences an increased fatigue.

SUMMARY OF THE INVENTION

It is, therefore, an object of the present invention to provide a pedal crank mechanism for a bicycle in which the above-mentioned problems can be solved in a proper manner.

This pedal crank mechanism comprises an active crank supported through a first fixed fulcrum shaft as a driving wheel shaft, a passive crank supported on a frame located in the vicinity of the driving wheel through a second fixed fulcrum shaft, a connecting lever connected to a free end of the active crank through a first free fulcrum shaft and also connected to a free end of the passive crank through a second free fulcrum shaft.

It further comprises a pedal attached to an end part on the opposite side to an end part on the second free fulcrum shaft side of the connecting lever.

The active crank is rotated about the first fixed fulcrum shaft in unison with the driving wheel by stepping force exerted to the pedal, and a rotational motion of the active crank is transmitted to the passive crank through the connecting lever to cause the passive crank to swing about the second fixed fulcrum shaft, thereby rotating the pedal along a non-circular track.

Moreover, the pedal crank mechanism for a bicycle according to the present invention comprises the following constitutional features A through D in comparison with the constitutional features A' through D' of the patent document 1:

- A. the second fixed fulcrum shaft is arranged on a rear side of the first fixed fulcrum shaft and above the first fixed fulcrum shaft;
- B. the passive crank extends downward beyond a line connecting the first and second fixed fulcrum shafts with each other from the second fixed fulcrum shaft and the second free fulcrum shaft at the free end of the passive crank is swung below the line connecting the first and second fixed fulcrum shafts with each other;

C. the pedal is attached to a projection end in the vicinity of the first free fulcrum shaft of the connecting lever and arranged in the vicinity of the free end of the active crank; and D. the pedal is rotated along a non-circular track passing between the first fixed fulcrum shaft of the active crank and the second fixed fulcrum shaft of the passive crank, and the first fixed fulcrum shaft is located at an internal area of the non-circular track.

Owing to the pedal crank mechanism having the above-mentioned constitutional features, local load alternately imposed on the two legs is reduced by moving the left and right legs through a combination of the vertical direction and the back and forth direction in the pedal stepping track toward the lower rotational dead point from the upper rotational dead point.

Hence, in the stepping track for one leg pedal toward the lower rotational dead point from the upper rotational dead point, the muscles of the entire leg are used in a well-balanced manner. In addition, in the returning track for the other leg pedal toward the upper rotational dead point from the lower rotational dead point, the pedal is returned to the upper rotational dead point in a natural manner without forming an unnatural shape of the leg, and the pedal is ready to be stepped downward again. Consequently, the power factor can be increased without giving fatigue to the rider.

BRIEF DESCRIPTION OF THE DRAWINGS

FIG. 7 is a side view showing a state in which the pedal in the pedal crank mechanism is located at a rear rotational dead point.

FIG. 8(A) shows a pedal track in the embodiment of the present invention and FIG. 8(B) shows a pedal track in the patent document 1.

DETAILED DESCRIPTION OF THE EMBODIMENT

One embodiment of a pedal crank mechanism for a bicycle according to the present invention will be described hereinafter with reference to FIGS. 1 through 8(A).

Figure 2:
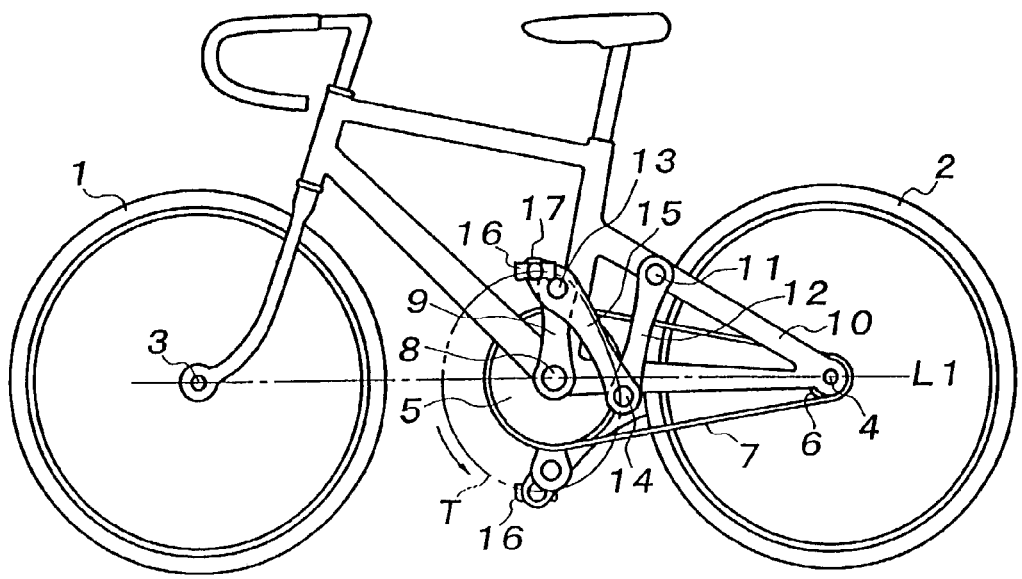
FIG. 2 is a side view of a bicycle equipped with the above-mentioned pedal crank.

In FIG. 2, reference numeral 1 denotes a front wheel which rotates about a shaft 3, and reference numeral 2 denotes a rear wheel which rotates about a shaft 4. An endless transmission body such as an endless chain 7 is disposed between a driving wheel 5, which is placed between the front wheel 1 and the rear wheel 2, and a follower wheel 6 of the rear wheel 2. The rotational driving force of the driving wheel 5 is transmitted to the rear wheel 2 through the endless chain 7.

The front wheel 1 and the rear wheel 2 are equal in diameter. A shaft 8 of the driving wheel 5 is placed on a line L1 connecting the shaft 3 of the front wheel 1 and the shaft 4 of the rear wheel 2 with each other. In other words, the shaft 8 is placed on a generally horizontal line L1.

As shown in FIGS. 3 through 7, the pedal crank mechanism of the present invention comprises an active crank 9 supported through the shaft 8, i.e., the first fixed fulcrum shaft 8, of the driving wheel 5, and a passive crank 12 supported on a vehicle frame 10 in the vicinity of the driving wheel 5 through a second fixed fulcrum shaft 11.

The pedal crank mechanism further comprises a connecting lever 15 connected to a free end of the active crank 9 through a first free fulcrum shaft 13 and also connected to a free end of the passive crank 12 through a second free fulcrum shaft 14.

That is, one end of the connecting lever 15 is connected to a free end of the active crank 9 through the first free fulcrum shaft 13, and the other end is connected to a free end of the passive crank 12 through the second free fulcrum shaft 14, thereby connecting the free ends of the two cranks 9, 12 with each other.

A pedal 16 is attached to an end part of the connecting lever 15, which end part is spaced away from the first free fulcrum shaft 13 on a side thereof opposite the second free fulcrum shaft 14.

The active crank 9 is rotated about the first fixed fulcrum shaft 8 in unison with the driving wheel 5 by stepping force exerted to the pedal 16, and a rotational motion of the active crank 9 is transmitted to the passive crank 12 through the connecting lever 15 to cause the passive crank 12 to swing about the second fixed fulcrum shaft 11, thereby rotating the pedal 16 along a non-circular track.

Moreover, the pedal crank mechanism for a bicycle according to the present invention comprises the following constitutional features A through D in comparison with the constitutional features A' through D' of the patent document 1.

Constitutional Feature A

The second fixed fulcrum shaft 11 is arranged on a rear side of the first fixed fulcrum shaft 8 and above the first fixed fulcrum shaft 8.

Figure 1:
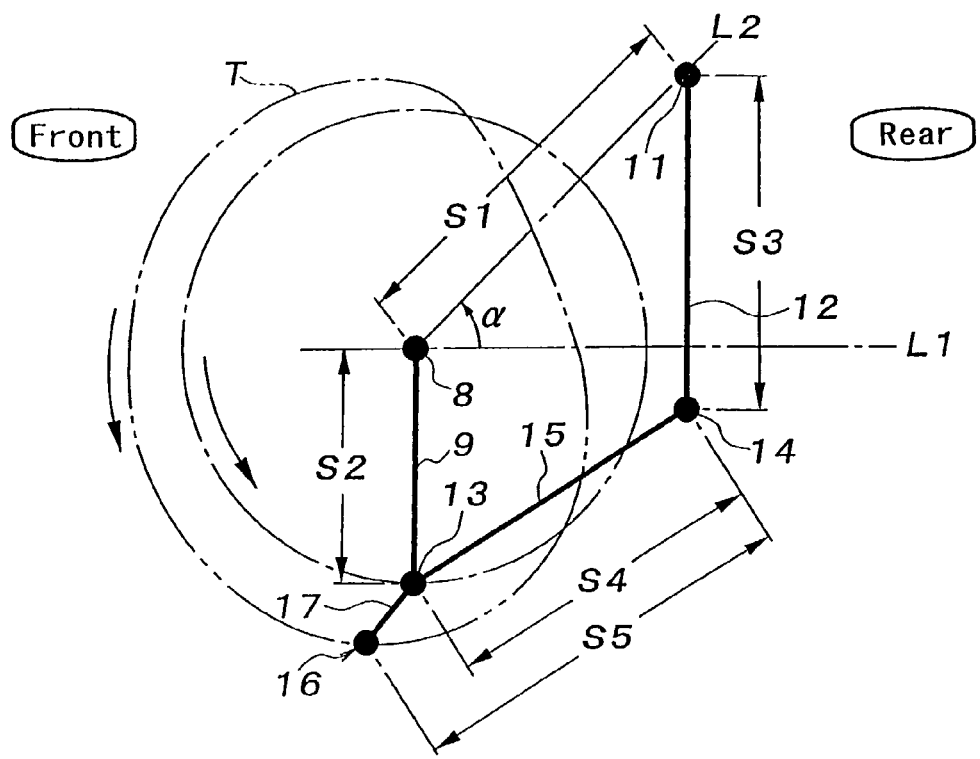
FIG. 1 is an explanatory view showing, in the form of a diagram, the position and size of each element in a pedal crank mechanism for a bicycle according to the present invention.

Preferably, the second fixed fulcrum shaft 11 is, as shown in FIG. 1, arranged obliquely upward and backward at an angle $\alpha$ ranging from 30 degrees to 60 degrees, for example, approximately 45 degrees, with respect to the first fixed fulcrum shaft 8, i.e., with respect to the horizontal line L1 passing through the first fixed fulcrum shaft 8. In other words, the angle $\alpha$ formed between a line L2 connecting the first fixed fulcrum shaft 8 and the second fixed fulcrum shaft 11 with each other and the horizontal line L1, is set, for example, to approximately 45 degrees.

Constitutional Feature B

The passive crank 12 extends downward beyond the line L2 connecting the first and second fixed fulcrum shafts 8 and 11 from the second fixed fulcrum shaft 11 and the second free fulcrum shaft 14 at the free end of the passive crank is 12 swung below the line L2 connecting the first and second fixed fulcrum shafts 8, 11 with each other. Reference character E denotes a swinging track of the second free fulcrum shaft 14.

As shown in FIG. 1, the length of the active crank 9, i.e., the distance S2 between the first fixed fulcrum shaft 8 and the first free fulcrum shaft 13 is set shorter than the distance S1 between the first fixed fulcrum shaft 8 and the second fixed fulcrum shaft 11.

On the other hand, the length of the passive crank 12, i.e., the distance S3 between the second fixed fulcrum shaft 11 and the second free fulcrum shaft 14 is set slightly shorter than the distance S1 between the first fixed fulcrum shaft 8 and the second fixed fulcrum shaft 11 but longer than the above-mentioned distance S2.

Similarly, the length of the connecting lever 15, i.e., the distance S4 between the first free fulcrum shaft 13 and the second free fulcrum shaft 14 is set slightly shorter than the distance S1 between the first fixed fulcrum shaft 8 and the second fixed fulcrum shaft 11 but longer than the above-mentioned distance S2.

This means that the distance S3, that is the length of the passive crank 12, is set approximately equal to the distance S4, that is the length of the connecting lever 15.

Preferably, it is set such that S1>S2, S2<S3 and S4; S1>S3 and S4; and S3=S4. Therefore, a relation of S1+S2<S3+S4 is established.

Constitutional Feature C

The pedal 16 is attached to a projection end 17 in the vicinity of the first free fulcrum shaft 13 of the connecting lever 15 and arranged in the vicinity of the free end of the active crank 9.

The pedal 16 is rotatably supported on the projection end 17 of the connecting lever 15 at the outside of the first free fulcrum shaft 13. The projection end 17 forms an end part of the connecting lever 15 and is spaced away from the first free fulcrum shaft 13 on a side thereof opposite the second free fulcrum shaft 14.

The distance S5 connecting the second free fulcrum shaft 14 and the shaft of the pedal 16 with each other is set longer than the distances S2 and S3 but equal or longer than the distance S1. That is, it is set such that S1=S5>S2 and S3.

Constitutional Feature D

The pedal 16 is rotated along a non-circular track T passing between the first fixed fulcrum shaft 8 of the active crank 9 and the second fixed fulcrum shaft 11 of the passive crank 12, and the first fixed fulcrum shaft 8 is located at an internal area of the non-circular track T.

That is, the pedal 16 is rotated along the non-circular track T shown in FIGS. 3 through 7.

Figure 3:
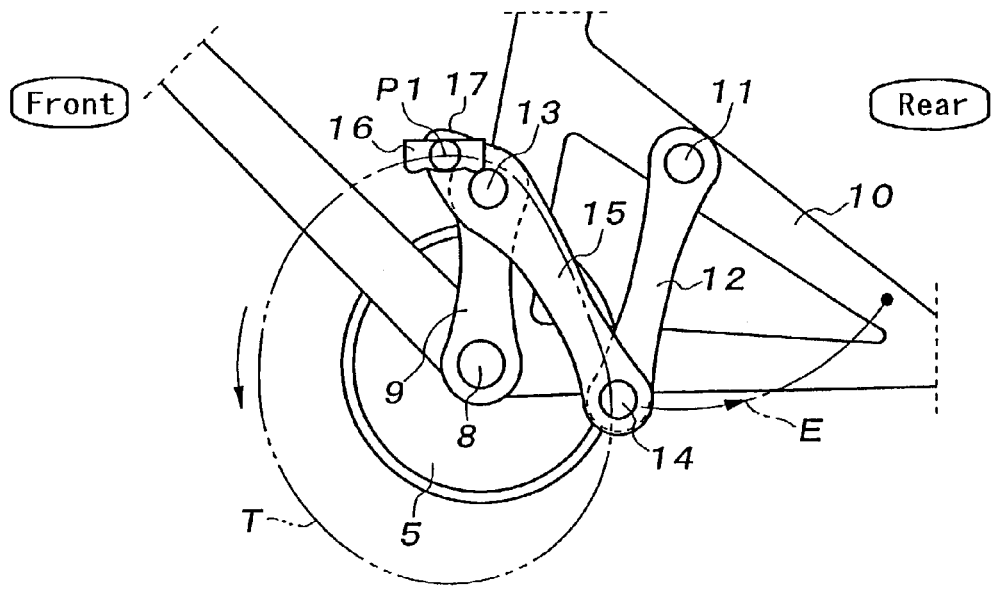
FIG. 3 is a side view showing a state in which the pedal in the pedal crank mechanism is located at an upper rotational dead point.

Specifically, as shown in FIG. 3, when one pedal 16 is located at the upper rotational dead point P1 on the non-circular track T, the active crank 9 extends upward and the passive crank 12 extends downward, i.e., the active and passive cranks 9, 12 extend in the mutually opposite vertical directions in parallel relation, the second free fulcrum shaft 14 at the free end of the passive crank 12 is located at a mid-way point of a swaying track E, and the connecting lever 15 obliquely extends between respective free ends, located in vertically opposite directions, of the active and passive cranks 9, 12. At that time, the other pedal 16 is located at the lower rotational dead point P3 shown in FIG. 6.

Figure 4:
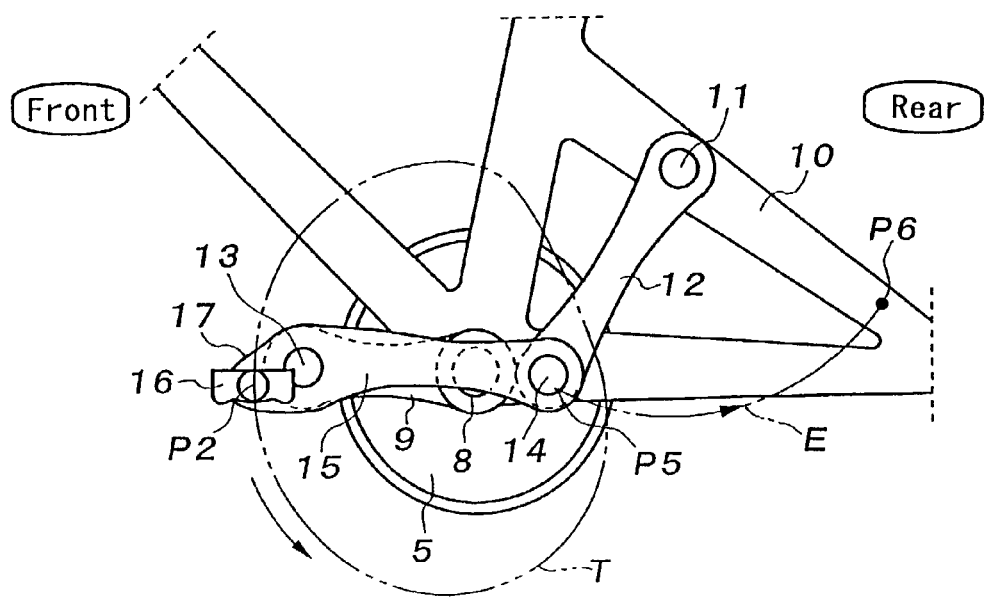
FIG. 4 is a side view showing a state in which the pedal in the pedal crank mechanism is located at a front rotational dead point.

As shown in FIG. 4, when one pedal 16 is rotated from the upper rotational dead point P1 to the front rotational dead point P2 of the track T, the active crank 9 and the connecting lever 15 are brought into a generally overlapped relation, and the second free fulcrum shaft 14 of the free end of the passive crank 12 is located at the front swinging dead point P5 of the swinging track E. At that time, the other pedal 16 is located at the rear rotational dead point P4 shown in FIG. 7.

The rotational track T1 from the upper rotational dead point P1 to the front rotational dead point P2 is an arc-shape.

Figure 5:
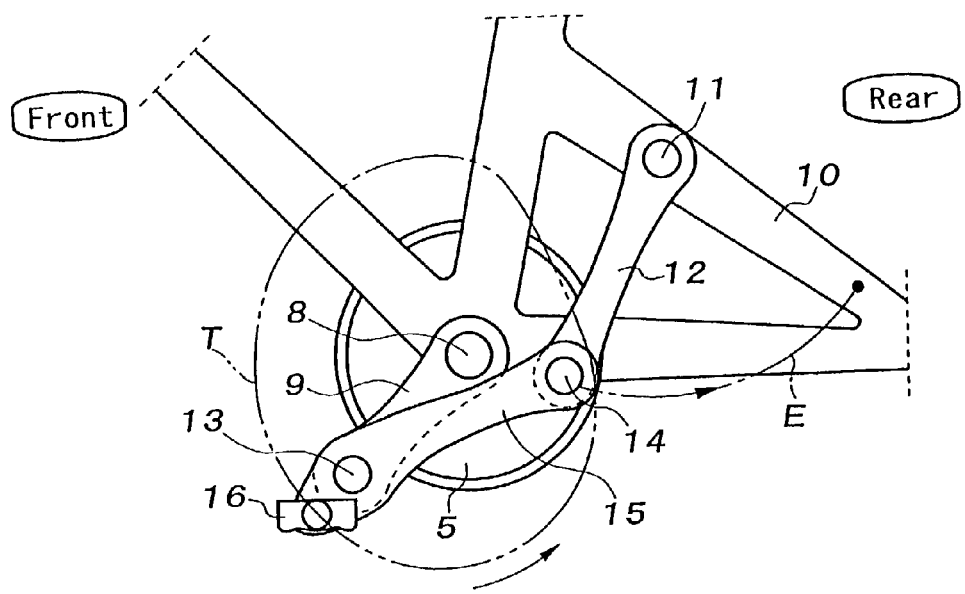
FIG. 5 is a side view showing a state in which the pedal in the pedal crank mechanism is located at an intermediate point between the front rotational dead point and a lower rotational dead point.
Figure 6:
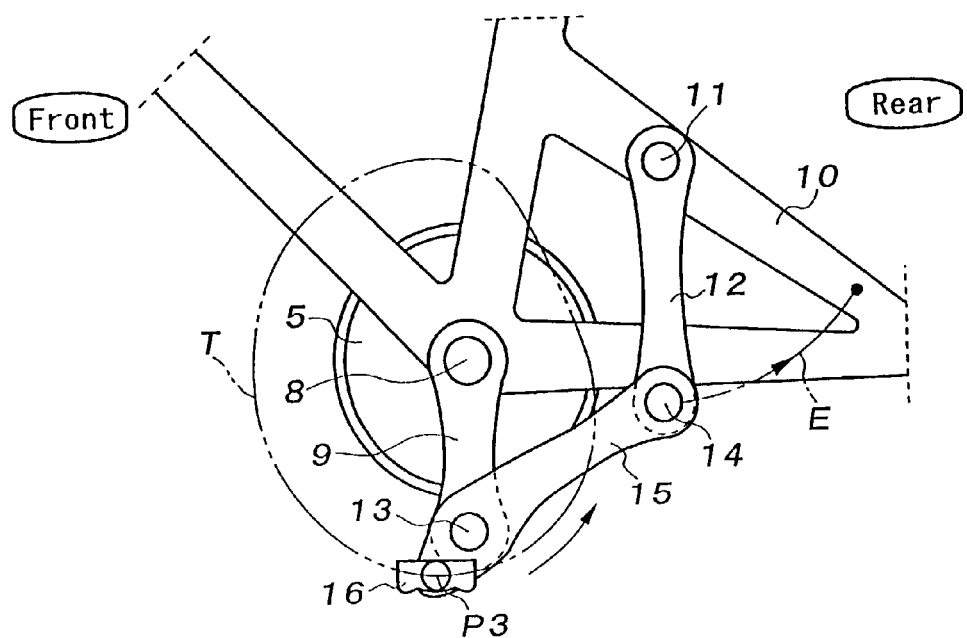
FIG. 6 is a side view showing a state in which the pedal in the pedal crank mechanism is located at the lower rotational dead point.

Thereafter, when one pedal 16 is rotated from the front rotational dead point P2 shown in FIG. 4 to the lower rotational dead point P3 shown in FIG. 6 via a rotational route shown in FIG. 5, the active and passive cranks 9, 12 are extended in the same direction (downward) in parallel relation, the second free fulcrum shaft 14 at the free end of the passive crank 12 is located at a mid-way point of the swinging track E, and the connecting lever 15 is obliquely extended between the two free ends which are located at the lower sides of the active and passive cranks 9, 12. At that time, the other pedal 16 is located at the upper rotational dead point P1 shown in FIG. 3.

The rotational track T2 from the front rotational dead point P3 to the lower rotational dead point P3 is an arc-shape.

Then, when one pedal 16 is rotated from the lower rotational dead point P3 to the rear rotational dead point P4 of the track T, the active crank 9 and the connecting lever 15 are brought into generally elongated states and the second free fulcrum shaft 14 at the free end of the passive crank 12 is located at the rear swinging dead point P6 of the swinging track E. At that time, the other pedal 16 is located at the front rotational dead point P2 shown in FIG. 4.

The rotational track T3 of the pedal 16 from the lower rotational dead point P3 to the rear rotational dead point P4 is an arc-shape smaller or equal to those of the rotational tracks T1, T2 from the upper rotational dead point P1 to the lower rotational dead point P3. The arc-shape of the rotational track T3 is an arc-shape which is indented towards the first fixed fulcrum shaft 8.

Thereafter, one pedal 16 is returned to the dead point P1 along the generally linear rotational track T from the rear rotational dead point P4 shown in FIG. 7 to the upper rotational dead point P1. At that time, the other pedal is located at the lower rotational dead point P3 shown in FIG. 6.

FIG. 8(A) shows the non-circular track T of the pedal 16 in the pedal crank mechanism for a bicycle according to the above-mentioned embodiment, and FIG. 8(B) shows the non-circular track T in the patent document 1.

The non-circular track T of the patent document 1 is a deformed prolate elliptical track which is vertically long but laterally short. In contrast, the non-circular track T of the above embodiment is a non-circular track in which the vertical length of the deformed prolate elliptical track is properly compressed and the lateral length is increased.

Owing to the pedal crank mechanism thus constructed, local load alternately imposed on the left and right legs can be reduced by moving the left and right legs through a combination of the vertical direction and the back and forth direction in the pedal stepping track toward the lower rotational dead point from the upper rotational dead point.

Thus, in the stepping track of the pedal 16 from the upper rotational dead point P1 to the lower rotational dead point P3, the muscles of the entire leg can be used in a well-balanced manner and therefore, accumulation of fatigue can be prevented.

In addition, in the returning rotational track for the leg pedal 16 toward the upper rotational dead point P1 from the lower rotational dead point P3, the pedal 16 is returned to the upper rotational dead point P1 in a natural manner without forming an unnatural shape of the leg, and the pedal 16 is ready to be stepped downward again. Consequently, the power factor can be increased without fatiguing the rider.

By employing the constitution of the present invention, there can be obtained a track which is at least similar to the non-circular track T shown in FIG. 8(A), i.e., a track in which the deformed prolate elliptical track of the related art is improved.

Obviously, many modifications and variations of the present invention are possible in light of the above teachings. It is, therefore, to be understood that within the scope of the appended claim, the invention may be practiced otherwise than as specifically described.

What is claimed is:

1. A pedal crank mechanism for a bicycle, comprising:
   an active crank supported through a first fixed fulcrum shaft, said first fixed fulcrum shaft serving as a shaft of a driving wheel;
   a passive crank supported on a frame through a second fixed fulcrum shaft and located in the vicinity of said driving wheel;
   a connecting lever connected to a free end of said active crank through a first free fulcrum shaft and also connected to a free end of said passive crank through a second free fulcrum shaft;
   a pedal attached to a first end part of said connecting lever opposite a second end part of said connecting lever on which the second free fulcrum shaft is located; and
   said active crank being rotated about said first fixed fulcrum shaft in unison with said driving wheel by stepping force exerted to said pedal, a rotational motion of said active crank being transmitted to said passive crank through said connecting lever to cause said passive crank to swing about said second fixed fulcrum shaft, thereby rotating said pedal along a non-circular track, wherein:

A. said second fixed fulcrum shaft is arranged on a rear side of said first fixed fulcrum shaft and above said first fixed fulcrum shaft,
   B. said passive crank extends downward beyond a line connecting said first and second fixed fulcrum shafts with each other from said second fixed fulcrum shaft, and said second free fulcrum shaft at the free end of said passive crank is swung below the line connecting said first and second fixed fulcrum shafts with each other,
   C. said pedal is attached to a projection end of said connecting lever provided in said first end part of said connecting lever in the vicinity of said first free fulcrum shaft and arranged in the vicinity of the free end of said active crank, and
   D. said pedal is rotated along a non-circular track passing between said first fixed fulcrum shaft of said active crank and said second fixed fulcrum shaft of said passive crank, and said first fixed fulcrum shaft is located at an internal area of said non-circular track.

* * * * *